INVENTOR.
THEODORE C. SCARLETT

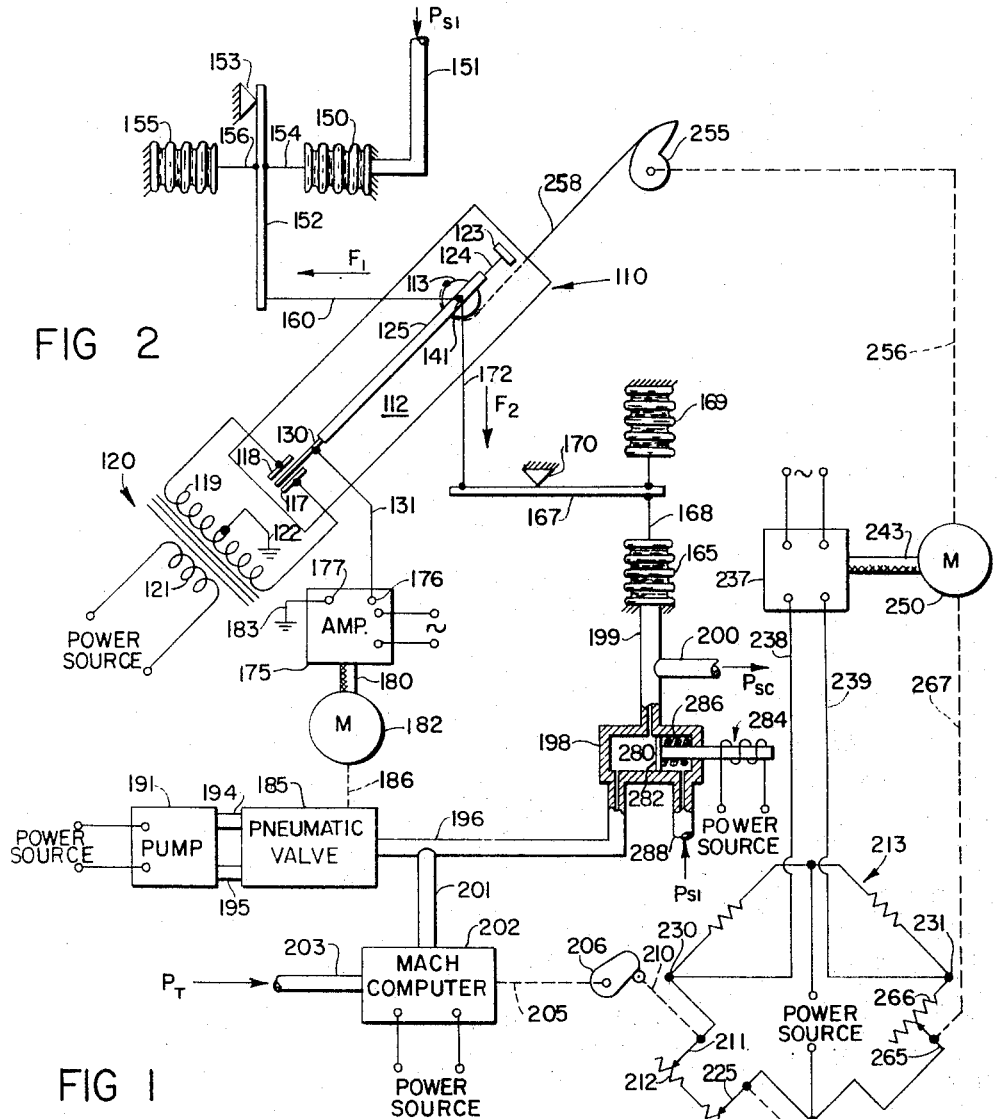
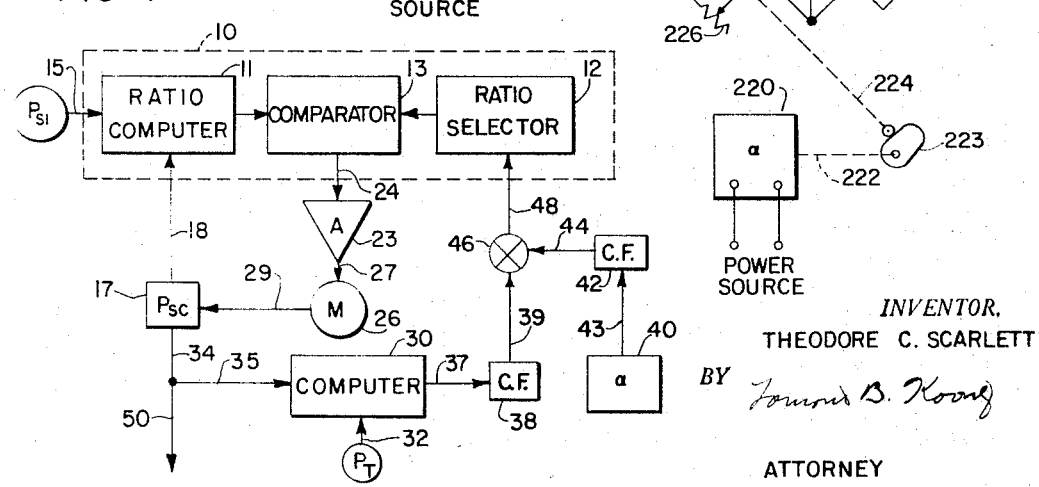

United States Patent Office 3,299,701
Patented Jan. 24, 1967

3,299,701
PRESSURE CONTROL APPARATUS
Theodore C. Scarlett, Minneapolis, Minn., assignor to Honeywell Inc., a corporation of Delaware
Filed Dec. 22, 1958, Ser. No. 782,194
19 Claims. (Cl. 73—178)

This invention relates to control apparatus and more particularly to apparatus for controlling a corrected static pressure source for an aircraft. More particularly, the invention relates to apparatus for correcting the indicated static pressure sensed for an aircraft which is supposed to be a function of altitude but which is also affected by the speed and the angle of attack of the aircraft. Many applications require accuracy greater than that obtainable by the static pressure sensor and hence some means must be provided which will correct the indicated static pressure for speed or Mach number, symbolized by M and angle of attack, symbolized by alpha, $\alpha$.

It is therefore an object of the present invention to provide a pressure source having, as an output, a controlled pressure equal to the corrected static pressure for use in an aircraft wherever corrected static pressure is needed.

It is a further object of the present invention to provide a controlled source of pressure which is corrected for a number of varying conditions which normally affect the pressure source.

It has long been known that corrected static pressure $P_{sc}$ is related to indicated static pressure $P_{si}$ by some function of Mach number or speed and to a lesser degree by angle of attack. These functions depend to a large extent upon the design of the aircraft but may be expressed generally by:

$$\frac{P_{si}}{P_{sc}} = f(\alpha, M)$$

where M is the Mach number, $\alpha$ is angle of attack, $P_{si}$ is indicated static pressure, and $P_{sc}$ is corrected static pressure. The present device accurately creates a corrected static pressure for subsequent use by instruments or autopilot components by comparing the ratio $P_{si}/P_{sc}$ to a desired value computed from $\alpha$ and M.

The ratio between $P_{si}$ and $P_{sc}$ is compared to the desired value by use of apparatus which is similar in structure to that shown in a copending application of Robert J. Kutzler, Serial No. 432,249, filed May 25, 1954.

Briefly the operation can be summarized as follows. The ratio between the indicated static pressure $P_{si}$ and the pressure $P_{sc}$ is compared to a desired value, approximately for the moment. Any difference produces a signal which adjusts $P_{sc}$ to bring the actual ratio to the approximated desired value. The desired value is obtained by a Mach sensor and an angle of attack sensor operating through characterizing means. The output of the Mach sensor depends in part on the value of $P_{sc}$ which in turn changes according to Mach, $\alpha$ and $P_{si}$. Adjustment of $P_{sc}$ in a direction to reduce the difference between the actual ratio and the desired ratio or value thus tends to vary the value of the desired ratio to a more exact and less approximate value with a consequent further refinement in $P_{sc}$ which in turn results in a more exact value of the desired ratio. This self correcting action is sometimes called a "bootstrap" arrangement because changes in $P_{sc}$ produce changes in Mach which in turn produce changes in $P_{sc}$. The apparatus keeps correcting until balance is reached at which time $P_{sc}$ is correct and there is no "approximation" in the desired value or ratio.

The operation of this invention will become more clear upon reference to the specification and drawings in which:

FIGURE 1 is a functional block diagram of the present invention,

FIGURE 2 is a schematic representation of a preferred embodiment of the present invention.

Figure 3:
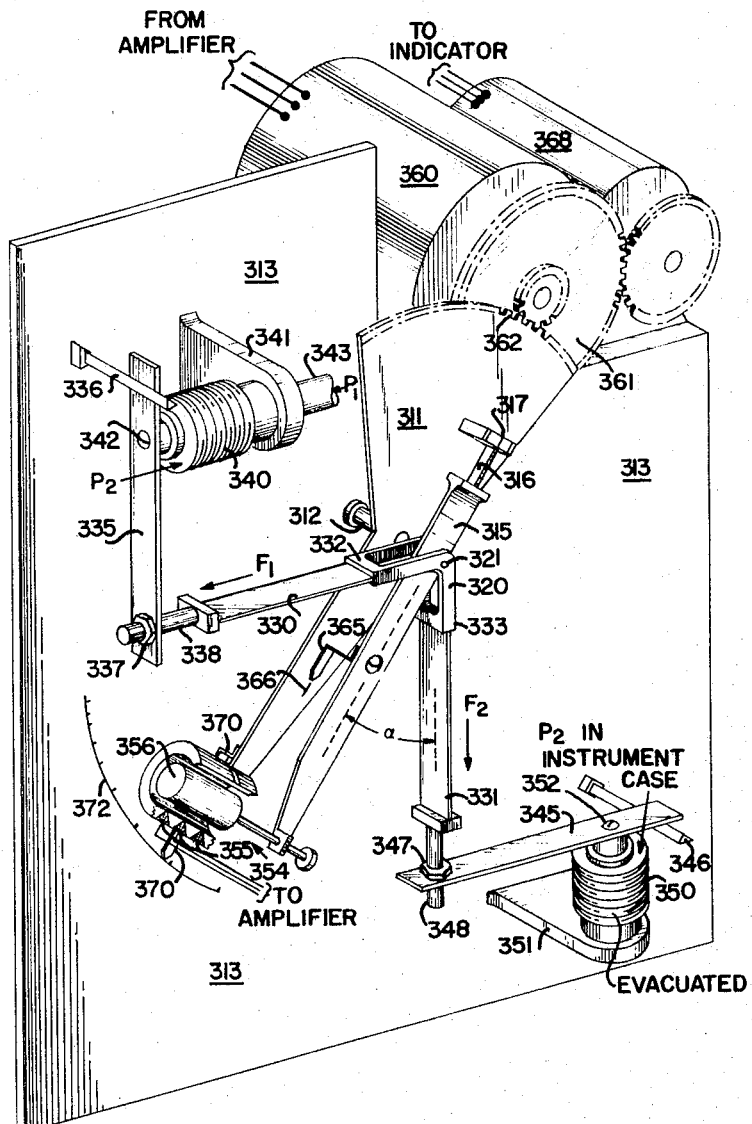
FIGURE 3 is a more detailed representation of a portion of FIGURE 2 to be later designated as 110.

With reference to FIGURE 1, a ratio device 10, shown in dashed lines, may comprise apparatus similar that shown in the above mentioned Kutzler application and is shown for illustration to contain 3 components; a ratio computer 11, a ratio selector 12 and a comparator 13. The ratio computer measures the ratio of two input pressures, a first of which, $P_{si}$, is derived from the Pitot tube of the aircraft and is fed to the ratio device 10 by means of a conduit 15. The second pressure, $P_{sc}$, is derived from a source of controlled pressure 17 and is fed to the ratio device 10 through a conduit 18. A signal from the ratio computer 11 substantially indicative of the ratio between $P_{si}$ and $P_{sc}$ is presented to the comparator 13.

The ratio selector 12 develops a signal indicative of a desired function of the speed of the aircraft in terms of Mach number (M), and the angle of attack ($\alpha$) of the aircraft. This signal, which is indicative of the desired ratio, between $P_{si}$ and $P_{sc}$, is presented from the ratio selector 12 to the comparator 13.

The comparator 13 compares the actual ratio from the ratio computer 11 with the desired ratio from the ratio selector 12 and gives an output signal indicative of any difference therebetween. This signal is presented to an amplifier 23 by a connection 24.

Amplifier 23 operates to drive a reversible motor 26 by a connection 27, which motor in turn operates to adjust the pressure $P_{sc}$ from the source 17 by a connection 29. The pressure $P_{sc}$ is thus increased or decreased in order to bring the ratio between $P_{sc}$ and $P_{si}$ to the desired value at which time balance is reached, the comparator sends no signal to the amplifier 23, and the motor 26 stops.

As stated, the ratio selector 12 sets the desired ratio according to a function of M and $\alpha$. For a particular aircraft, the correction necessary to produce a corrected static pressure, knowing the indicated static pressure, is a predetermined function of M and $\alpha$. In FIGURE 1 a computer 30 is shown having a first pressure input 32 derived from a source of total pressure $P_T$ which may be the Pitot tube of the aircraft. A second pressure input is obtained from the source of $P_{sc}$ 17 through conduits 34 and 35. The computer 30 computes the ratio $$\frac{P_T - P_{sc}}{P_{sc}}$$

which is a function of Mach number, and may, like the ratio device 10, comprise mechanism of the type shown in the above mentioned Kutzler application although other conventional Mach computers may be used. An output indicative of the speed of the aircraft in terms of Mach number is presented by a connection 37 to a correction factor device 38. The correction factor device 38 alters the signal indicative of Mach number according to a predetermined function and may comprise a cam or potentiometer or the like which is characterized according to the correction factor necessary. The output of the correction factor device 38 is indicative of the component of $f(\alpha, M)$ determined by M, and appears on a connector 39.

In the same manner, a signal indicative of $\alpha$ is derived from an $\alpha$ sensor 40, presented to a correction factor device 42 by a connection 43 and an output indicative of the component of $f(\alpha, M)$ determined by $\alpha$, appears on a connector 44. The $\alpha$ sensor 40 may be a common vane type or may be like that shown in Kliever Patent 2,537,932 which is assigned to the same assignee as the present invention.

The outputs of the correction factor devices 38 and 42 appearing on connectors 39 and 44 are presented to a combining network 46, which may be a Wheatstone bridge or a conventional adding circuit. The output from network 46 is indicative of the desired $f(\alpha, M)$ and is fed by connection 48 to the ratio selector 12 in the ratio device 10 to cause the ratio selector to produce a signal indicative of the desired ratio.

The pressure source 17 also presents the corrected static pressure to the necessary aircraft instruments by means of conduits 34 and 50.

In operation, any error in $P_{sc}$ from corrected static pressure causes the ratio of $P_{si}$ and $P_{sc}$ to depart from the desired value and results in an output from comparator 13. This output drives motor 26 to increase or decrease $P_{sc}$ through pressure source 17 so that rebalance is re-established. When $P_{sc}$ changes however, the input to the computer 30 changes indicating the corresponding change in Mach number. A different signal indicative of Mach number is then fed to the correction factor device 38 from computer 30. A new signal is then presented to the combining network 46 and, by means of connector 48, a new desired value is presented to the ratio selector 12. Another error signal is then presented to amplifier 23 driving motor 26 to establish a new $P_{sc}$. The new $P_{sc}$ is fed back by conduit 18 to cause rebalance, and is also presented by conduits 34 and 35 to the computer 30. Another change in M is produced but the change is smaller than the last and the process repeats until the whole system is in balance at which time $P_{sc}$ represents the actual corrected static pressure. The same process would occur if angle of attack changed and the system in all cases quickly adjusted to provide a substantially constant source of corrected static pressure in conduit 50.

Reference will now be made to FIGURE 3 which as previously mentioned is a more detailed embodiment of a portion of FIGURE 2. A member in the form of a gear sector 311 is pivoted at a pivot 312 on a frame 313. A detector beam or lever 315 is pivoted at one end by a reed hinge 316 to a block 317 attached to the gear sector 311. The reed hinge 316 effectively establishes a pivotal axis for the detector beam parallel to the pivotal axis of the gear sector in the frame 313. A member 320 is pivoted to the detector beam 315 by a pin 321 which is normally on the pivotal axis of the gear sector. Two laterally flexible strips 330 and 331 extend mutually at right angles from the member 320 and are adapted to transmit the two forces being compared to the detector beam.

A lever 335 is pivoted to the frame 313 on a knife edge 336 and is attached at its other end to the strip 330 by a nut 337 on a screw 338. A bellows 340 is fixed at one end to a bracket 341 on the frame 313. The movable end of the bellows 340 is attached at 342 to the lever 335. The bellows 340 has a pressure inlet 343. A lever 345 is pivoted to the frame 313 on a knife edge 346 and is attached at its other end to the strip 331 by a nut 347 on a screw 348. An evacuated bellows 350 is attached at one end to a bracket 351 on the frame 313 and has its movable end attached at 352 to the lever 345.

If lever 335 and 345 are of equal length and the attachment 342 of bellows 340 to lever 335 is the same distance from pivot 336 as the attachment 352 of bellows 350 to lever 345 is from pivot 346 and the effective area of bellows 340 and 350 are equal, then the ratio of the two forces on member 320 is equal to the ratio of the pressures effective on bellows 340 and 350.

The resultant force caused by the pressures at bellows 340 and 350 will cause the detector beam 315 to assume a position in which the two pivots of the detector beam 315 lie along the line of the resultant force at the pivot pin 321 of the two forces due to the pressures at bellows 340 and 350.

A signal generating means 354 is composed of a coil section 355 attached to the gear sector 311 and a core portion 356 attached to the detector beam 315. The signal generating means senses the position of the detector beam 315 relative to the gear section 311. When the pin 321 is in the same axis as pivot 312, the mechanism is in a balanced condition with a null signal from the signal generator.

A motor means 360 and gear train 361 bear a fixed relation to the frame 313, the motor 360 being mounted on frame 313. The gear train 361 engages the gear teeth 362 of gear sector 311 and is adapted to position gear sector 311 with respect to frame 313. A signal produced by the signal generating means 354 is suitably amplified by an amplifier (not shown) and applied to the motor 360 to rotate the gear sector 311 until a null signal is attained. The ratio of the pressure in bellows 340 to the pressure on bellows 350 will be indicated by the angular position of gear sector 311 on frame 313 when pin 321 and pivot 312 are in the same axis. The ratio can be measured in terms of the tangent of the angular position of the gear sector.

A pressure $P_1$ is sensed by bellows 340 through pressure inlet 343. A second pressure $P_2$ is within a case (not shown) of the device and surrounds the outside of both bellows 340 and 350. The force $F_1$ on the detector beam 315 is proportional to $P_1 - P_2$. The force $F_2$ on the detector beam 315 is proportional to $P_2$. The tangent angle $\alpha$ between the detector beam 315 and extension 331 will equal $F_1/F_2$. Therefore, tan angle $\alpha$ is equal to $$\left(\frac{P_1 - P_2}{P_2}\right)K \text{ or } \left(\frac{P_1}{P_2} - 1\right)K$$

where K is a constant determined by the area of the bellows, the length of 335 and 345 and position on 335 and 345 of 342 and 352. This forms the useable pressure ratio relationship to provide indication or control.

If we now start from a balanced condition with pin 321 and pivot 312 in the same axis with the resultant of the forces $F_1$ and $F_2$ falling in line with the detector beam 315 the following will show the function of the device. With an increase in $P_1$ to change the ratio of $P_1$ to $P_2$ the force $F_1$ will be proportionally increased. The increasing of force $F_1$ will cause the detector beam 315 to rotate clockwise with respect to gear section 311 at reed hinge 316. The signal generator 324 will detect this relative movement and through an amplifier (not shown) causes rotation of motor 360. Motor 360 when rotating will cause gear train 361 which engages gear sector 311 to rotate clockwise also. This will cause clockwise rotation of gear sector 311 about pivot point 312. The rotation of gear sector 311 will cause a rotation of the pivot 316 of the detector beam 315 on gear sector 311. The movement of the pivot 316 of detector beam 315 will cause a change of the relative position of point 321 on detector beam 315 with respect to gear section 311 in order to balance the force moments on detector beam 315 from $F_1$ and $F_2$. This process will continue until pin 321 and pivot 312 again are in the same axis and the signal generator is again in a null position. There will now be a different angle $\alpha$ between the detector beam 315 and extension 331. The pressure ratio of the changed $P_1$ to $P_2$ will again be a function of the tangent of the angle $\alpha$.

A pointer 365 is attached to detector beam 315 and cooperates with dial markings 366 and gear sector 311 to give a visual indication of when pin 321 and pivot 312 are in the same axis and the mechanism is in a balanced condition.

An extension 370 attached to gear sector 311 has a pointer 371 that cooperates with a dial on the frame 313. The dial on frame 313 can be calibrated to indicate the pressure ratio of the pressures $P_1$ to $P_2$.

As will be realized the pressure $P_1$ of FIGURE 3 is equivalent the aforementioned pressure $P_{si}$. As may also be determined from further examination of the specification, the pressure $P_2$ which is applied to the outside of the bellows in FIGURE 3 will be applied to the interior of bellows 165 in FIGURE 2 as pressure $P_{sc}$. This is only a minor structural difference and is easily altered by one skilled in the art.

Referring to FIGURE 2, a more complete showing of the apparatus is made. The apparatus shown generally by reference numeral 110 is a pressure ratio mechanism similar in structure to that shown in the above mentioned Robert Kutzler copending application but used for controlling purposes as will be shown. This apparatus includes a pivoted arm 112 which is connected to a shaft 113 for rotation. Attached to one extremity of the pivoted arm 112 is a pair of capacitor plates 117 and 118 forming a part of a capacitance pick off. Capacitor plates 117 and 118 are energized from a secondary 119 of a transformer 120 having a primary 121. Secondary 119 has a grounded center tap at 122. Near the opposite end of the pivoted arm 112 is an extension 123 which carries a resilient strap 124. The resilient strap 124 is connected to and provides a spring or reed pivot for a force beam or arm 125 but any conventional pivoting mechanism such as a bearing or the like could be used to allow beam 125 to rotate with respect to the pivoted arm 112. It is seen that the axis of rotation of the arm 125 is displaced from the axis of rotation of the pivoted arm 112 but is substantially parallel thereto. Near the other extremity of the arm 125 is mounted a capacitor plate 130 which operates between the two capacitor plates 117 and 118. When plate 130 is centrally located between plates 117 and 118 there is no signal thereon, but when rotation of the arm 125 with respect to the pivoted arm 112 produces relative displacement between the capacitor plate 130 and the capacitor plates 117 and 118, an electric signal is present on plate 130 which is of a first or an opposite phase depending on the direction of rotation. This signal is brought out of the system by means of a conductor 131 connected to the capacitor plate 130. It should be realized that various other types of apparatus could be used to provide an electrical signal corresponding to relative movement between the command angle arm 112 and the sensing arm 125 such as a variable transformer, a potentiometer or switch contacts. The electrical signal thus created is used for control purposes to be further explained below.

The arm 125 is caused to rotate with respect to the pivoted arm 112 under the influence of forces $F_1$ and $F_2$ which act upon a pin 141 connected to arm 125 and which is normally situated colinear with the axis of rotation of the pivoted arm 112. The forces $F_1$ and $F_2$ normally act on pin 141 at right angles to each other, and arm 125 assumes a position corresponding to the resultant of these two forces.

Force $F_1$ is produced by means of a bellows 150 which expands and contracts under the influence of a pressure $P_{si}$ derived from a tube 151 which leads to the Pitot tube of the aircraft. The bellows 150 operates on a lever 152 to produce a force around a pivot 153 by means of a mechanical connection 154. An exacuated bellows 155 is used to provide a force on the lever 152 by means of a mechanical connection 156 to substantially cancel the effect of the pressure existing on the outside of both of the bellows. This is necessary since the bellows 150 actually produces a force which is the difference between the input pressure $P_{si}$ and the pressure existing around the outside of the bellows. The bellows 155 produces a force dependent only on the pressure existing outside the bellows and since these two forces act in opposite directions the total force acting on the level 152 is a function only of the indicated static pressure $P_{si}$. Near the end of lever 152 remote from pivot 153 a mechanical member, 160 which may be a rod or a flexible strip, is connected which in turn is connected to the pin 141. The force produced on the lever 152 produces the force $F_1$ on the member 160 which applies this force to the pin 141.

In a like manner a bellows 165 produces a force on a lever 167 by means of a mechanical connection 168, which force is proportional to the pressure within the bellows 165. As before, the effects of the pressure on the outside of the bellows 165 is compensated for by an evacuated bellows 169 which applies a force to lever 167 proportional to the pressure existing on the outside of the bellows. The force on lever 167 is then due only to the pressure in bellows 165.

The lever 167 operates around a pivot 170 and has connected to its end a mechanical member 172 which may be the same as member 160. Member 172 is connected to pin 141 and transmits force $F_2$ to the arm 125. The arm 125 thus is positioned by forces $F_1$ and $F_2$ which are applied at right angles to each other to a point on the arm 125 normally co-linear with the axis of rotation of the pivoted arm 112 and which are respectively proportional to the indicated static pressure and to the pressure in bellows 165.

As stated any displacement between the capacitor plate 130 and the capacitor plate 117 and 118 will produce an electrical signal along conductor 131 which signal is presented to a phase sensitive amplifier 175 at input terminal 176. The other input terminal 177 is connected to ground at 183 and the amplifier 175 is shown connected to a source of reference voltage. The output of amplifier 175 is connected by a cable 180 to a reversible motor 182 to drive motor 182 in a first or a second direction depending upon the phase of the signal presented to the amplifier 175. The amplifier motor may be any common phase sensitive combination such as that shown in the A. P. Upton Patent, 2,423,539, which is assigned to the same assignee as the present invention. The motor 182 positions a valve shown generally in block form as valve 185 by means of a mechanical connection shown as dash line 186. A pump shown in block form as 191 is connected to a source of power and operates through conduits 194 and 195 to provide a pressure to the valve 185. Depending upon the position of the valve 185 a certain portion of this pressure appears in conduit 196 connected to the output of valve 185. The pressure existing in conduit 196 is fed through a fail safe valve 198, to be later described, to a conduit 199 which leads to the interior of bellows 165 and also to the output conduit 200 of the system. It is seen then that the pressure existing in conduit 196 because of the position of valve 185 operates to produce the force $F_2$ through the bellows 165 and linkage mechanism previously described. Of course the pump 191 and valve 185 could be replaced by a variable speed pump or other device to obtain a variable pressure source.

The pressure existing in conduit 196, which normally is the corrected state pressure as will be further explained, is also fed by means of a conduit 201 to a computing device shown in block form as Mach computer 202. A second conduit 203 is connected to the Mach computer and provides a pressure proportional to the total pressure, $P_T$, sensed by the Pitot tube in the aircraft. The M computing device 202, as stated above, may be a ratio type computer such as is shown in the above mentioned copending application of Robert J. Kutzler or may be any sort of Mach computer having an output which is a function of the speed of the aircraft in terms of Mach number. The output of the Mach computer 202 is shown as a mechanical connection 205 connected to control the position of a cam 206. By knowing the design characteristics of an aircraft, the amount of correction necessary to convert $P_{si}$ to $P_{sc}$ is known as a function of Mach and $\alpha$. Cam 206 is characterized so as to provide an output which is a function of the factor needed to correct the indicated static pressure according to Mach for the aircraft in question. This output is fed by means of a mechanical connection shown as 210 to a wiper 211 of a variable resistor 212 which forms a part of one leg of a Wheatstone bridge shown generally at 213.

An angle of attack, or $\alpha$ sensor, shown in block form as 220 may be a common vane arrangement or may be like that shown in the above mentioned Kliever patent.

Sensor 220 produces a mechanical output dependent on the angle of attack of the aircraft. This mechanical motion is fed by means of a mechanical connection shown as dash line 222 to a cam 223 which is characterized to produce a mechanical output which is a function of the correction factor necessary to convert $P_{si}$ to $P_{sc}$ due to angle of attack. This output is shown as dash line 224 and is connected to control the position of a wiper 225 of a variable resistor 226 which with resistor 212 forms one leg of the Wheatstone bridge 213. The resistance of resistors 212 and 226 are a function of respective correction factors for Mach and α which together form the necessary total correction factor to convert $P_{si}$ into $P_{sc}$. Normally, the correction for Mach is much larger than the correction for α, so resistors 212 and 226 may be appropriately weighted to produce the desired effect. This called for correction appears as an unbalance voltage across the output terminals 230 and 231 of bridge 213. The unbalance voltage is fed to a phase sensitive amplifier 237 by means of conductors 238 and 239. Amplifier 237 is connected to a source of reference voltage and by means of a cable 243 applies its output to drive a reversible motor 250. The amplifier 237 and motor 250 combination may be the same as amplifier 175 and motor 182. Motor 250 then is positioned according to the total correction factor due to α and Mach and in turn positions a cam 255 by means of a mechanical connection shown as dashed line 256. Cam 255 operates to rotate command angle arm 112 by means of a mechanical connection such as a tape or band 258 connected to shaft 113. Cam 255 is shaped according to a tangent function and is used to position the command angle arm 112 according to a "called for" ratio as determined by the corrections for α and Mach. Since the right angle ratio mechanism 110 operates according to a tangent function, that is its position is a tangent function of the ratio of the forces $F_1$ and $F_2$, the tangent shape of cam 255 provides the correct movement of the command angle arm 112 with respect to the sense arm 125.

Motor 250, in addition to driving cam 255, also positions a wiper 265 on a resistor 266 by means of a mechanical connection 267. Resistor 266 forms the rebalance arm of the Wheatstone bridge 213 and is adjusted by motor 250 until there is no voltage across terminals 230 and 231 at which time amplifier 237 sees no voltage and motor 250 stops.

To provide a fail safe source of static pressure, the valve 198 is inserted between the valve 185 and the output conduit 200. This comprises a chamber 280 divided by a piston 282 which is held in the position shown by a solenoid 284 against the bias of a spring 286. Solenoid 284 is energized, for example, from the aircraft power source. In the position shown, the pressure from valve 185 is free to pass to the output conduit 200. On the other side of piston 282 is a source of indicated static pressure on $P_{si}$ from conduit 288. In case of failure of the power source, solenoid 284 will release piston 282 which will then move to the left under the action of spring 286 and will block passage between the valve 185 and output conduit 200. The pressure $P_{si}$ will then be free to pass from conduit 288 to output conduit 200 which, although inaccurate, will at least prevent complete failure of the devices depending on static pressure and will prevent damage to the aircraft.

*Operation*

Assume that all parts are in balance so that the called for ratio of $P_{si}/P_{sc}$ and the actual ratio of $P_{si}/P_{sc}$ are the same. Under these conditions, the position of the arm 125 with respect to the pivoted arm 112 is such that capacitor plate 130 is at electrical null between capacitor plates 117 and 118. No signal is then presented to amplifier 175 and motor 182 is stopped. The pump 191 is supplying a pressure $P_{sc}$ through valve 185, conduit 196, valve 198 and conduit 199 to bellows 165 which is just sufficient to hold sensing arm 125 against the force due to the pressure $P_{si}$ in bellows 150 in the null position. In addition, the pressure from valve 185 is presented through conduits 196 and 201 to the Mach computer 202 which is compared to the pressure $P_T$ according to a function of $$\frac{P_T - P_{sc}}{P_{sc}}$$

The output of the computer 202 operating through cam 206 is holding wiper 211 at a position on resistor 212 and the output from the α device operating through cam 223 is holding wiper 225 at a position on resistor 226 such that no voltage exists between output terminals 230 and 231 of bridge 213. Amplifier 237 then sees no voltage and motor 250 is stopped which holds wiper 265 on resistor 266 at the correct balancing position and which, through cam 255, holds the pivoted arm 112 at the correct position with respect to arm 125. Under these conditions, the Mach and α devices are calling for a certain ratio of $P_{si}/P_{sc}$ depending on the present speed and angle of attack of the aircraft. Since the called for ratio is being met by the ratio device 110 the pressure in bellows 165 is correct and represents corrected static pressure $P_{sc}$. This pressure is presented to the aircraft instruments through conduit 200.

Now assume that the total pressure $P_T$ increases showing that the aircraft Mach has increased. This will call for a different correction to adjust $P_{sc}$. The output of the Mach device will rotate cam 206 an amount depending on the magnitude of the change in Mach and cam 206 will position wiper 211 on resistor 212 according to the desired correction factor for that Mach. Movement of wiper 211 to a new position creates an unbalance voltage across terminals 230 and 231 of magnitude indicative of the new desired correction factor. Amplifier 237 will then see the unbalance voltage and will drive motor 250 until wiper 265 has moved on resistor 266 an amount sufficient to balance the bridge 213 at which time motor 250 stops.

During this time cam 255 has been moved to a new position which turns the pivoted arm 112 to a new position indicative of the new called for ratio of $P_{si}/P_{sc}$. At this point force $F_2$ has not yet changed and arm 125 will tend to remain in its present position. Pivoted arm 112 thus moves with respect to arm 125 and capacitor plates 117 and 118 move with respect to capacitor plate 130. This causes a signal on plate 130 of sense dependent upon the direction of relative displacement between the pivoted arm 112 and the arm 125. This signal is presented to amplifier 175 and drives motor 182 in a direction dependent on the sense of the signal from plate 130. Motor 182 then starts to open or close valve 185 depending on the direction of rotation of motor 182 and changes the pressure in conduit 196. This new pressure is presented to bellows 165 via valve 198 and conduit 199 and changes the force $F_2$ through the linkage of connection 168, lever 167, and band 172. The new force $F_2$ will move or allow movement of sensing arm 125 in a direction which will bring capacitor plate 130 back to the null position with respect to plates 117 and 118 and motor 182 will then stop.

The new pressure in conduit 196 will however be presented to the Mach computer 202 to change the balance thereof and as a result cam 206 will again be rotated a small amount by mechanical connection 205. This causes a small movement of wiper 211 and the whole process repeats until a second new pressure exists in conduit 196. The second new pressure in conduit 196 again affects the output of the Mach computer 202 but by a much smaller amount. This "bootstrap" process is repeated by ever decreasing amounts until the whole system is insensitive to the minute changes and equilibrium is again established. The same process would occur if the angle of attack were to change. In each case a new equilibrium is reached where the pressure in conduit 196, bellows 165 and conduit 200 represents the value of the corrected static pressure $P_{sc}$ as called for by the correction for Mach and $\alpha$.

From the step by step description of the process it might appear that considerable time is consumed to obtain a new equilibrium but this is not the case. The various adjustments occur rapidly so that a substantially constant source of corrected static pressure $P_{sc}$ is maintained.

It is seen that the invention will provide a static pressure source corrected for changes in Mach number and angle of attack. Many substitutions and modifications will occur to those skilled in the art and I do not intend to be limited by the specific embodiments shown. I intend only to be limited by the following claims.

I claim:

1. Apparatus of the class described comprising, in combination: mechanical force ratio apparatus having a pair of force inputs, a member whose angular position is indicative of the ratio of the inputs and means connected to said member to provide an electrical output which varies with change in the ratio of the inputs, a first of the inputs variable in accordance with a variable condition and the second of the inputs variable in accordance with a controlled condition; means responsive to the electrical output; condition controlling means operable by said last named means to control the controlled condition; and further means operable in accordance with the controlled condition to position the member.

2. Condition controlling apparatus comprising: a force ratio computing apparatus having a first input applying force in accordance with a variable condition, a second input applying force in accordance with a controlled condition, a first member connected to the first and second inputs and positionable thereby, a second member positioned in accordance with the ratio of the first and second inputs, said first and second members normally having a predetermined relative position with respect to each other, and means producing an electrical signal in accordance with displacement of said first and second members from the predetermined relative position; signal responsive means connected to said last named means and operable thereby to vary the controlled condition; and further means operable in accordance with the controlled condition to position the second member.

3. Condition controlling apparatus comprising: a first member rotatable about a first axis; a second member mounted on said first member and rotatable about an axis parallel to but displaced from the first axis; means applying a first and a second force to said second member at a point substantially co-linear with the first axis, the first force being responsive to a variable condition and the second force being responsive to a controlled condition; means responsive to the relative positions of said first and second member and operable to vary the controlled condition; further means operable in accordance with the controlled condition to produce an output which is a function thereof; and means connected to the last named output to vary the position of said first member.

4. Apparatus of the class described comprising, in combination: force ratio apparatus having a first member whose position is indicative of the ratio of a first and a second force, a second member whose position is determined by the first and second force, said first and second members normally having a first relative position, and means responsive to the relative positions of the first and second member operable to provide an output indicative thereof, the output being substantially zero when the first member and the second member are in the first relative position; means connected to receive the output to vary the second force; and further means connected to the second force and operable thereby to vary the position of the first member.

5. Apparatus of the class described comprising in combination: a source of a first pressure; a source of a second pressure; ratio apparatus comparing the ratio of the first and second pressures to a desired value and having an output indicative of the difference therebetween; means connected to receive the output of said ratio apparatus and responsive thereto to control the magnitude of said second pressure; further pressure responsive means having an output which is a function of the second pressure; and means connected to receive the output of further pressure responsive device to control the desired value of the ratio of said first and second pressures.

6. Apparatus of the class described comprising, in combination: a source of a first pressure; a source of a second pressure; apparatus for measuring the actual ratio of the first and the second pressures and comparing the actual ratio with desired ratio; means connected to said apparatus to control the magnitude of the second pressure in accordance with the difference between the actual ratio and the desired ratio; a source of a third pressure; means connected to said sources of second and third pressures and having an output which is a function of the ratio of the second and third pressures; and further means connected to receive the output of said last named means and connected to said apparatus, said further means operable to adjust the desired ratio according to a predetermined function of the ratio of the second and third pressures.

7. Apparatus of the class described comprising, in combination: sources of first and second pressures; a ratio device having a first element positioned according to a desired ratio between said first and second pressures and a second element positioned by said first and second pressures, said first element being in a predetermined position with respect to said second element when the ratio of said first and second pressures is of the desired value, said ratio device having an output indicative of the error between the ratio of said first and second pressures and the desired ratio; means responsive to the output to adjust the second said pressures; and means indicative of a condition connected to said ratio device to adjust the position of said first element to set the desired ratio.

8. A condition control device comprising, in combination: a ratio device having a first and a second input indicative of a first and second condition respectively, a third input and an output which is a function of the difference between the magnitude of the ratio of the first and second inputs and the magnitude of the third input; means connected to receive the output for adjusting the magnitude of the second condition; and means responsive to the second condition for varying the magnitude of the third input.

9. Apparatus of the class described comprising, in combination: apparatus having a first and a second input of magnitude indicative of a first and a second condition respectively, a variable third input and an output which is a function of the ratio of the first and second inputs compared with the third input; means connected to receive the output for controlling the magnitude of the second condition to minimize the output; and means connected to receive the second input and responsive to the second condition for varying the third input.

10. Apparatus of the class described comprising, in combination: apparatus having a first and a second input of magnitude indicative of a first and a second condition respectively, a variable third input and an output which is a function of the ratio of the condition indicative inputs compared with the third input; means connected to receive the output for controlling the magnitude of the second condition to minimize the output; and means connected to receive the second input and to receive a fourth input indicative of a third condition for varying the third input in accordance with a function of the second and third conditions.

11. Apparatus of the class described comprising in combination: apparatus having a first input indicative of a first pressure, a second input indicative of a second pressure of controlled magnitude, a third input of variable magntiude indicative of a desired condition and means comparing the magnitude of the ratio of the first two inputs with the magnitude of the third input and producing an output indicative of an error therebetween; means connected to receive said output for controlling the second pressure to reduce the error; condition responsive means connected to receive the second input and responsive at least in part to said second pressure for producing an output indicative of the desired condition; and means connected to receive the output of said condition responsive means to vary the third input in accordance with the desired condition.

12. A corrected static pressure source comprising, in combination: pressure responsive means having a first input connected to a source of indicated static pressure, a second input connected to a source of variable pressure, a third input adjustable in accordance with a desired ratio between indicated static pressure and corrected static pressure and an output indicative of an error between the ratio of the first and second inputs and the desired ratio; means connected to receive the output for controlling the source of variable pressure to reduce the error; further pressure responsive means having a first input connected to the source of variable pressure, a second input connected to a source of total pressure and an output which is a function of the ratio of the first and second inputs of said further pressure responsive means; and means connected to receive the output of said further pressure responsive means and operable in accordance with the ratio determined by said further pressure responsive means to adjust the third input.

13. Apparatus for controlling a pressure comprising, in combination: pressure responsive means having a first input connected to a first pressure source, a second input connected to a second source of pressure of controlled magnitude, a third and variable input, means comparing the third input with the ratio of the first and second inputs and providing an output signal indicative of error therebetween; means connected to receive the output signal of said last named means to control the magnitude of said second source of pressure to reduce the error; first condition responsive means having an output indicative of a first condition; second condition responsive means having an output indicative of a second condition; and means connected to receive and combine the outputs of said first and second condition responsive means to vary the third input of said pressure responsive means.

14. Apparatus of the class described comprising, in combination: a first pressure ratio responsive device having a first input connected to a first source of variable pressure, a second input connected to a source of controlled pressure, a first member positioned by the first and second inputs, a third input, and a second member positioned by said third input, said first and second members normally having a predetermined relative position; means comparing the positions of said first and second members and providing an output indicative thereof; means connected to receive the output of said last named means and operable to control the pressure to the second input of said first pressure ratio responsive device; a second pressure ratio responsive device having a first input connected to the source of controlled pressure, a second input connected to a second source of variable pressure and an output indicative of the ratio between the first and second inputs of said second pressure ratio responsive device, condition responsive means having an output; further means combining the outputs from said second pressure ratio responsive device and said condition responsive means to produce an output; and means responsive to the output of said further means connected to the third input of said first pressure ratio device to position said second member.

15. Condition controlling apparatus comprising, in combination: a ratio computer having a first input indicative of a variable condition, a second input indicative of a controlled condition and an output which varies with the actual ratio of the first and second inputs; comparing means connected to receive the output from said ratio computer as a first input, having a second input which varies with a desired ratio of the first and second inputs to said ratio computer and having an output which varies with the difference between the actual ratio and the desired ratio; condition controlling means connected to receive the output from said comparing means and operable to vary the controlled condition in such a way as to minimize the difference between the actual ratio and the desired ratio; means operable in accordance with the controlled condition to provide a signal indicative of the desired ratio; and means connected to said comparing means to apply said signal to the second input thereof.

16. Apparatus for providing a corrected static pressure source on a craft having a source of indicated static pressure thereon comprising, in combination: a source of variable pressure; pressure ratio apparatus having a first input connected to the source of indicated static pressure, a second input connected to the source of variable pressure, means providing a first signal which varies as a function of the actual ratio between the indicated static pressure and the variable pressure, means providing a second signal which varies as a function of the speed of the craft in terms of Mach and means comparing the first and second signals and producing an output which is a function of the difference therebetween; and means connected to receive the output from said pressure ratio apparatus to adjust said source of variable pressure in such a way as to reduce the difference between the first and second signals, said source of variable pressure providing the requisite corrected static pressure.

17. Apparatus for providing a corrected static pressure source on a craft having a source of indicated static pressure and a source of total pressure thereon comprising, in combination: a source of variable pressure; pressure ratio apparatus having a first input connected to receive the pressure from the source of indicated static pressure, a second input connected to receive the pressure from the source of variable pressure, means providing a first signal which varies as a function of the actual ratio between the indicated static pressure and the variable pressure, means providing a second signal which varies as a function of the speed of the craft in terms of Mach, and means comparing the first and second signals and producing an output which is a function of the difference therebetween; means connected to receive the output from said pressure ratio apparatus and operable to adjust the pressure from said source of variable pressure in such a way as to reduce the difference between the first and second signals; Mach responsive means having a first input connected to receive the pressure from the source of total pressure and a second input connected to receive the pressure from the source of variable pressure and providing an output which varies as a function of the speed of the craft in terms of Mach; and means connected to the output of said Mach responsive means and connected to said pressure ratio apparatus to provide the second signal therein, the variable pressure being adjusted until the difference between the first and second signals is a minimum at which time the source of variable pressure is providing corrected static pressure.

18. Apparatus for controlling a first condition the magnitude of which varies with a second condition to an extent determined by a third condition and in which the third condition depends in part upon the magnitude of the first condition comprising, in combination: means responsive to the first, second and third conditions to produce an output indicative of a comparison of a ratio of the first and second conditions with the third condition; means responsive to the output to control the first condition in such a way as to minimize the output; and means responsive to the first condition to create a new third condition to be compared with the ratio of the first and second conditions in said first named means, the apparatus being continually rebalanced until the first condition has the proper magnitude as determined by the second and third conditions.

19. Apparatus of the class described comprising, in combination:
first means having first and second inputs indicative of first and second conditions respectively and having a variable third input, said first means including a first member movable in accordance with the first and second inputs, a second member movable in accordance with the third input and including means connected to said first and second members to produce an output in accordance with their relative positions;
second means connected to said first means to receive the output therefrom and operable to control the magnitude of the second condition to minimize the output; and
third means connected to the second input and responsive to the second condition for varying the third input.

References Cited by the Examiner

UNITED STATES PATENTS

| | | | |
|---|---|---|---|
| 2,537,932 | 1/1951 | Kleiver | 73—180 |
| 2,538,824 | 1/1951 | | |
| 2,599,288 | 6/1952 | Schaefer | 73—182 |
| 2,869,367 | 1/1959 | Moore | 73—182 |
| 2,950,075 | 8/1960 | Owen | 244—77 |
| 2,989,868 | 6/1961 | Rosenberger | 73—407 |
| 3,002,382 | 10/1961 | Gardner | 73—182 |
| 3,038,339 | 6/1962 | Colvin | 73—407 |
| 3,072,326 | 1/1963 | Rohmann et al. | 235—61 |
| 3,086,599 | 4/1963 | Brown | 73—178 |
| 3,086,702 | 4/1963 | Bowditch | 235—61 |
| 3,126,736 | 3/1964 | Howard et al. | 73—178 |

FOREIGN PATENTS 681,544  9/1939  Germany.

OTHER REFERENCES

Publication, "Transducer and Servo Systems Generate Ratio of Pressures," Design News, November 15, 1956, pages 30 and 31.

LOUIS R. PRINCE, *Primary Examiner.*

ISAAC LISANN, RICHARD C. QUEISSER, *Examiners.*

A. F. KWITNIESKI, R. T. FROST, D. O. WOODIEL,
*Assistant Examiners.*